Figure 1:
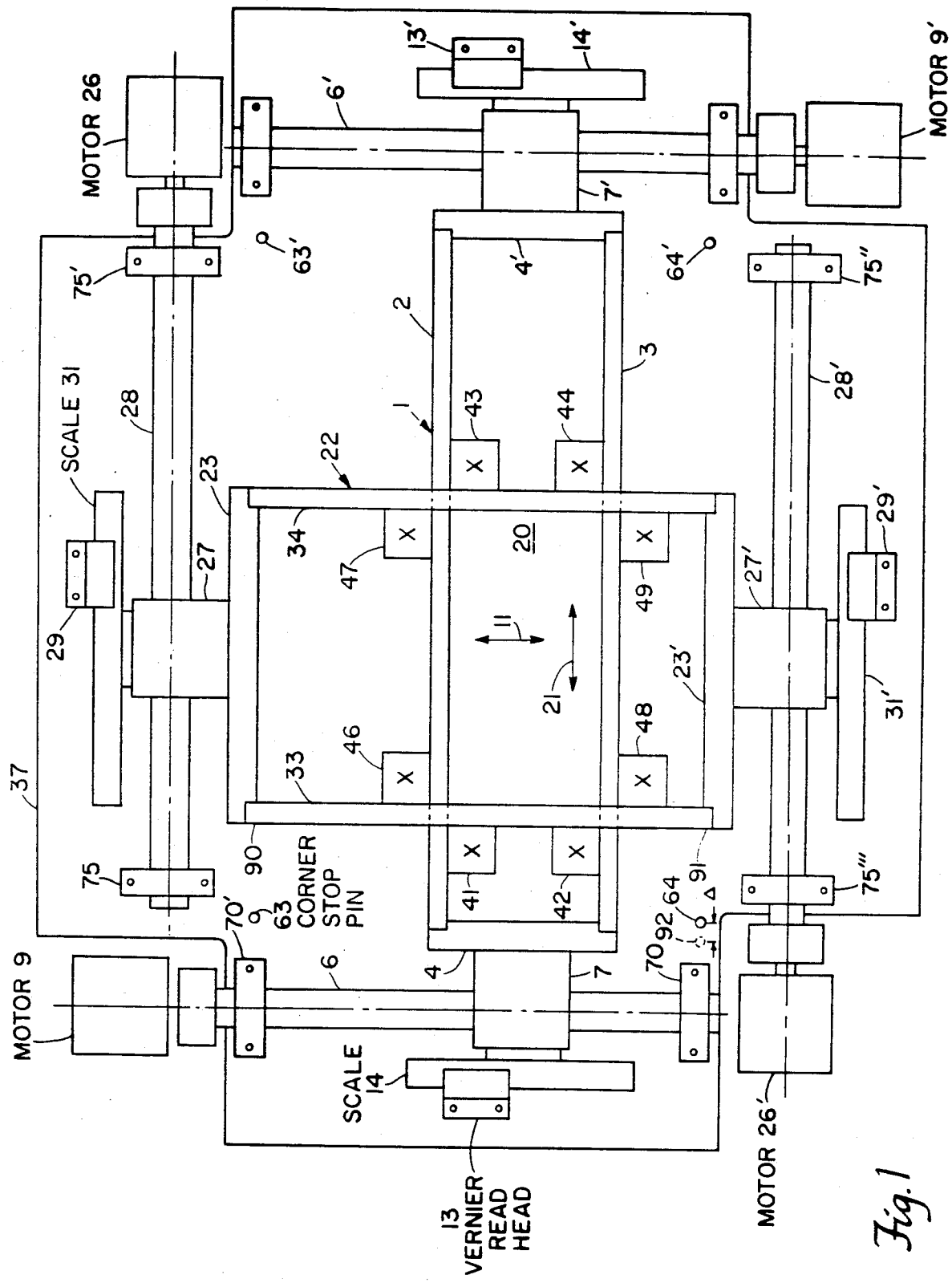

United States Patent [19]

Shamir

[11] Patent Number: 4,676,492
[45] Date of Patent: Jun. 30, 1987

[54] SHALLOW X-Y TABLE POSITIONING DEVICE HAVING LARGE TRAVEL CAPABILITY

[76] Inventor: Arye H. Shamir, 20 Shute Path, Newton Center, Mass. 02159

[21] Appl. No.: 750,021

[22] Filed: Jul. 1, 1985

[51] Int. Cl.⁴ ............................................. B23Q 1/02
[52] U.S. Cl. .................................................. 269/73
[58] Field of Search .......................... 108/20, 143, 137; 269/73, 285, 60; 308/3 A; 248/424, 429; 33/1 M, 174 L; 250/442, 311; 350/83, 86

[56] References Cited

U.S. PATENT DOCUMENTS

| | | | |
|---|---|---|---|
| 3,563,186 | 2/1971 | Piper et al. ........................ | 108/143 |
| 4,392,642 | 7/1983 | Chitayat ............................ | 269/73 |
| 4,409,860 | 10/1983 | Moriyama et al. ................ | 108/143 |
| 4,505,464 | 3/1985 | Chitayat ............................ | 269/73 |

*Primary Examiner*—Robert C. Watson
*Attorney, Agent, or Firm*—Robert L. Nathans

[57] ABSTRACT

A first frame is provided, having a pair of parallel pusher bars, the inside surfaces thereof pressing against outer surfaces of a unitary workpiece support block positioned within the frame, and a second frame has a pair of pusher bars having inside surfaces pushing against the remaining outer surfaces of the unitary support block. Stationary drive means cause the independent orthogonal motion of each frame to thereby position the unitary block fitted between the overlapping frames. In a second arrangement, the unitary support block or post means is replaced by first and second pairs of post members in contact with inside surfaces of the parallel pusher bars of the first frame and in contact with outside surfaces of the parallel pusher bars of the second frame, and third and fourth pairs of post members are similarly positioned with respect to the frames. As a result, a shallow X-Y positioning system is provided enabling the direct transfer of the workpiece load through the post members to the base plate, thereby eliminating cross axis influences producing positioning inaccuracies. The overlapping relationship between the frame members also enables the X-Y motions to be very large if desired, and the second arrangement provides a central placement area for tooling.

26 Claims, 3 Drawing Figures

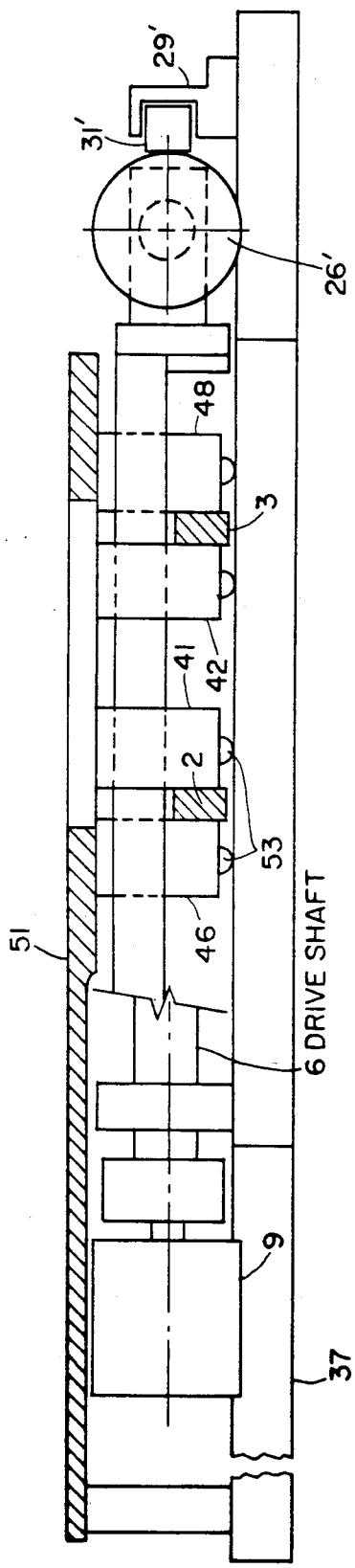
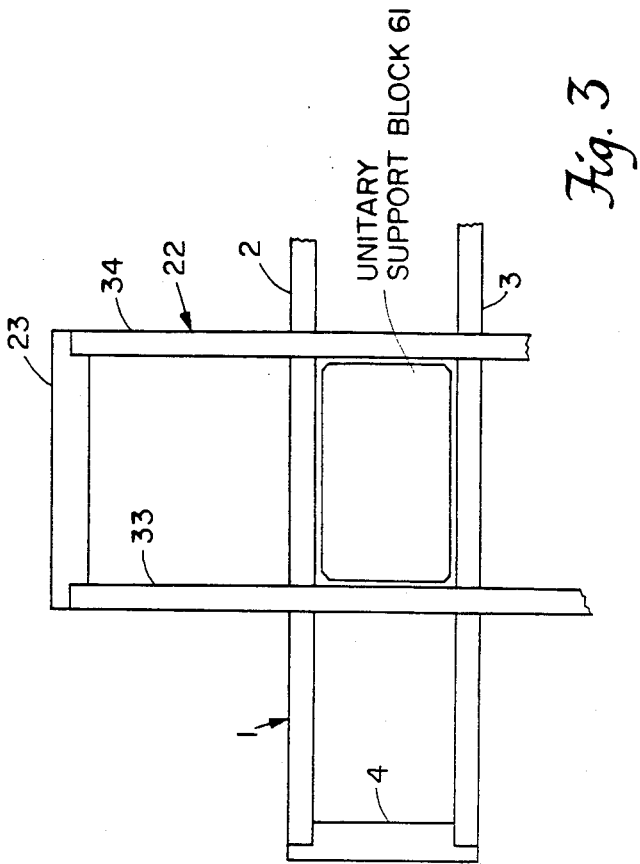
Fig. 2
Fig. 3

SHALLOW X-Y TABLE POSITIONING DEVICE HAVING LARGE TRAVEL CAPABILITY

BACKGROUND OF THE INVENTION

The present invention relates to the field of X-Y Tables for plotters, automatic drafting tables, positioning devices for workpieces such as printed circuit boards, laser systems, optical systems, and the like.

The more usual construction of X-Y Tables includes constructing a positioner assembly for the X axis and thereafter constructing an additional positioner assembly such that its slider will move in the Y direction generally perpendicular to the X direction where the former is built upon the latter. Such superpositioning of the X and Y positioning devices results in a system having a relatively large thickness. Moreover, the transfer of the vertical (Z direction) load of the workpiece to the base plate is through the bearing surfaces of both superposed Y and X positioning devices, and the result is that deflections and sags in the Z direction alter the true position of the workpiece relative to its theoretical position and increases the drag forces. U.S. Pat. No. 3,743,904 to Weisler et al. discloses an X-Y positioning device for eliminating the vertical stacking of the positioners by locating them in the same plane and transferring the weight of the workpiece to the base plate through four support blocks at the four corners of the top plate. This system however, as built and sold, suffers from the fact that the X motion moves the top plate in the X direction but generates deflections of the Y positioner in the horizontal plane due to the resulting cantilever loads, and thus the true position measurement is still inaccurate; also the extent of motion is limited; also the load creates sag in the top plate; also the system does not allow for a central access area below the top plate.

It is thus an object of the present invention to provide a novel X-Y positioning device which is shallow, simple in construction, very accurate and yet may be constructed to provide very large displacements of the workpiece in both the X and Y directions.

It is a further object of the present invention to provide a simple shallow X-Y positioning device which may transfer the vertical load, generally the weight of the workpiece but may include impact or other vertical forces upon the workpiece, directly from the top workpiece support plate above the positioning mechanisms to the base plate, bypassing completely the vertical loading of the bearings and bearing surfaces to thereby eliminate much of the cross influence of the axes upon each other. The vertical forces can also be transferred directly to the base plate via a stationary anvil-like device situated below the workpiece, if the application calls for this anvil-like device.

It is a further object of the invention to provide a simple and reliable X-Y positioning system having both X and Y drive devices essentially in the same plane and having the drive motors stationary relative to the base plate, thus decreasing the number of moving parts, moving electrical cables, moving fluid conduits, and undesired mass adding to the weight of the workpiece.

SUMMARY OF THE INVENTION

In accordance with one embodiment of the invention, a first frame member has a pair of parallel pusher bars, the inside surfaces thereof pressing against outer surfaces of a unitary support block positioned within the frame and a second frame member has a pair of pusher bars having inside surfaces pushing against the remaining outer surfaces of the unitary support block. Stationary drive means cause the independent orthogonal motion of each frame member to thereby position the unitary block fitted between the overlapping frame members. In a second presently preferred embodiment, the unitary support block or post means is replaced by first and second pairs of post members in contact with inside surfaces of the parallel pusher bars of the first frame member and in contact with outside surfaces of the parallel pusher bars of the second frame member, and third and fourth pairs of post members similarly positioned with respect to the frame members. As a result, a shallow X-Y positioning system is provided enabling the direct transfer of the workpiece load through the post means to the base plate, thereby eliminating the aforesaid cross axis influences producing measurement inaccuracies. The overlapping relationship between the frame members also enables the X-Y motions to be very large if desired, and the arrangement provides a central placement area for tooling.

Other objects, features and advantages of the present invention will become apparent upon study of the following specific description taken in conjunction with the drawings in which:

FIG. 1 illustrates a plan view of one embodiment;
FIG. 2 illustrates an end view of FIG. 1; and
FIG. 3 illustrates a second embodiment of the invention employing a single unitary support block.

SPECIFIC DESCRIPTION

Referring now to FIG. 1, illustrating the multiple support block or post member embodiment of the invention, the aforesaid X frame member 1 having a pair of parallel pusher bars 2 and 3 coupled together via terminal portions 4 and 4' is illustrated. Terminal portions 4 and 4' are coupled to drive mechanisms comprising nut or equivalent means 7 and 7' and a threaded or threadless screw 6 and 6' driven by motors 9 and 9'. Screw 6 is rotabably and axially supported by bearings 70 and 70'. Rotation of motors 9 and 9' produces X frame motion indicated by arrow 11. Read heads 13 and 13' are employed to read the position in X of the X frame member 1. Such is accomplished by scales 14 and 14' rigidly coupled to the drive mechanism as indicated. Rotation of the motor and the motion of the X frame along the directions indicated by arrow 11 thus causes relative motion of the scale with respect to the read heads which are stationary. The scales could include conventional analog position sensing devices known in the art or could be digital devices generating a series of binary bits such as produced by opaque and light transmissive sections, or produced by magnetically recorded spots, so that read heads 13 and 13' produce a series of pulses which may be counted by conventional electronic counters to indicate the position of the X frame member 1. Conventional phase quadrature reading heads may be employed to indicate the direction as well as the extent of the motion of X frame member 1.

In like manner, Y frame member 22 is provided for producing motions indicated by arrow 21 in directions perpendicular to the motion of the X frame indicated at 11. Terminal portions 23 and 23' corresponding to terminal portion 4 and 4' of the X frame member, are coupled to motors 26 and 26' via nut or equivalent means 27 and 27' and threaded or threadless lead screws 28 and 28', rotatably supported by bearings 75, 75', 75" and 75'''. Read head 29 and scale 31 are also provided to indicate the position of the Y frame member 22 in the same manner as described above in connection with read head 13 and scale 14; likewise 29' and 31' with 13' and 14'. Thus, first positioning means are provided including the above described X frame positioning device together with second positioning means including the Y frame member similar to the X frame positioning means and having parallel pusher bars 33 and 34 for providing motion in a direction perpendicular to the direction produced by motion of the X frame means. Motors 9, 26, 9' and 26', together with their associated drive components are affixed to the base plate 37 or mechanical ground as indicated in FIG. 2.

A first pair of post members or support blocks comprise blocks 41 and 42, and a second pair of post members or support blocks comprise blocks 43 and 44. It may be noted that outer surfaces of blocks 41, 42, 43 and 44 are in contact with the inside surfaces of pusher bars 2 and 3 of the X frame member whereas other outer surfaces thereof are also in contact with outside surface portions of pusher bars 33 and 34 of the Y frame member. In like manner, a third pair of support blocks comprising blocks 46 and 47 are provided together with a fourth pair of support blocks 48 and 49 arranged in a similar manner as the first and second pairs of blocks as shown. All eight of the support blocks or post members are rigidly or adjustably coupled to top plate element 51 shown in FIG. 2, which top plate in turn supports the weight of the workpiece being positioned by the system. All blocks are preferrably supported by the base plate 37 via bearing elements 53 shown in FIG. 2 to minimize frictional resistance.

Now let it be assumed we wish to move the top plate 51 supporting the workpiece in the horizontal directions indicated by arrow 11. Motors 9 and 9' are actuated to cause the X frame member to move for example upwardly in the horizontal plane toward the top of FIG. 1, which causes the pusher bar 2 to move blocks 46 and 47 upwardly to in turn move the top plate and the workpiece. Blocks 48, 49, 41 and 43, since they are also coupled to the top plate, will move along with blocks 46 and 47. Horizontal motion in the direction of arrow 11 will be produced in a similar manner by having pusher bar 3 press against the outside surfaces of blocks 48 and 49 and bar 2 press against blocks 41 and 43. Y frame means 22 could remain stationary. Motion in the orthogonal direction indicated by arrow 21 will be produced in a similar manner by causing motors 26 and 26' to move the Y frame mechanism 22 in the orthogonal direction to cause pusher bar 33 to push blocks 41 and 42 and to cause pusher bar 34 to push against blocks 49 and 47. For motion in the opposite direction parallel to arrowhead 21, pusher bar 33 pushes blocks 46 and 48 and pusher bar 34 pushes blocks 43 and 44. Combined motion of both X and Y frame members by simultaneous actuation of both motor pairs will produce a directed workpiece position change in both X and Y simultaneously. If desired, air or roller bearings, magnetic repulsors, or anti-friction pads or the like may be also positioned at the sides and/or bottoms of all of the support blocks to reduce frictional resistance.

The first pair of support blocks or post members 41 and 42 are also shown in FIG. 2 whereby they are nested between the X frame mechanism. Blocks 46 and 48 are also shown in FIG. 2 positioned against the outer surfaces of the parallel X frame members 2 and 3.

It should now be apparent that the above described embodiment of the invention provides for an extremely simple system for simultaneously positioning the top plate bearing the workpiece in both X and Y. The configuration is shallow so that the device may be readily placed upon a table between the lap of an operator and his or her arm or eye level. All of the prime mover mechanisms for driving the frame means are thus in substantially the same plane, and stationary relative to the base plate, thus decreasing the number of moving parts such as electrical cables, fluid conduits and the undesired mass of numerous components of X-Y Tables of the prior art. The resulting simplicity further reduces maintenance and the resulting downtime.

It is important to note that the central area 20, defined by the overlapping of the X and Y frame means, produces a new beneficial result in that tooling may be positioned in the area of overlap, such as an anvil for rivetting, or a lead bonder for electronic components to be affixed to a printed circuit board, provided that the motion of the X-Y frame devices is controlled so that they will not hit the tooling. A compact arrangement is thus provided.

An even simpler embodiment of the invention is illustrated in FIG. 3, wherein a unitary support block or post member 61 is positioned or nested between parallel pusher bars 2 and 3 of the X frame positioning means 1, and pusher bars 33 and 34 of the Y frame positioning means 22 as indicated. Alternatively, the unitary support block may be separated into four smaller blocks contacting the frame members in the same corners as the unitary support block depicted. The actuation of the X and Y frame means is as described above, and thus no further drive components will be included in FIG. 3 in interest of clarity, brevity and economy. In this embodiment, unitary support block 61 may be slidably fitted within the frame means. The center of gravity of the workpiece will usually be positioned in an overlaying relationship with respect to the unitary support block 61, so that direct transfer of the weight of the workpiece to the base plate is effected via block 61, which of course may be supported upon the base plate by bearing means similar to those shown in FIG. 2.

Another beneficial result of the above described embodiments of the invention is that, if desired, the top plate (which may be optional) supporting the workpiece may be moved relatively great distances in both X and Y, provided of course that the drive screws or equivalent means are extended in length. This is in contrast to the limited motion inherent in the above mentioned U.S. Pat. No. 3,743,904. FIG. 1 of that patent illustrates orthogonal guideways or grooves 24 and 22 that receive tongue members 32 and 30 which actuate the stage plate in orthogonal directions. However, in that arrangement, the guide ways and tongues cannot intersect, so that the extent of motion is inherently limited by that design. In contrast, the present invention enables the overlapping, or intersecting in a figurative sense, of the X and Y positioning means, preferably consisting of a pair of rectangular frame members.

Four corner stop support pins 63, 63', 64 and 64' are utilized to restrict the extent of motion of the positioning means, and limit switches may be employed therewith to shut off the motors as is well known to those skilled in the art.

Thus each axis has two mechanical drive mechanisms, screw or equivalent, located at each side of the axis, as shown in FIG. 1, e.g. for the X axis, items 6 and 6' with nuts or equivalent 7 and 7". The preferred configuration, shown in FIG. 1, has each drive screw or equivalent driven by its own motor, e.g. 9 and 9", and providing positional feedback via a position transducer of any suitable type known to those versed in the art. For purpose of clarity, a scale type positional transducer is shown in FIG. 1, e.g. items 14 and 14" with 13 and 13" vernier readouts, but could be any other means, such as a resistor strip or a laser interferometer.

As each motor may be independently controlled, an important benefit of the preferred embodiment of the invention is to utilize the intrinsic flexibility of each frame especially if it is long, to create perpendicularity between the two axes X and Y, by individually controlling the position of each frame end. More specifically, a first terminal portion of Y position frame 22 co-acts with corner stop pin 64 shown at the lower lefthand portion of FIG. 1. In like manner a second corner stop pin or element 63 co-acts with a second opposite terminal portion 90 of Y frame 22. A straight line between corner stop pin 63' (at the right portion of FIG. 1) and 63 will ideally be perpendicular to a straight line between corner stop pin 63 and corner stop pin 64, and thus pin 63 and 64 define a limit position of the elongated Y frame positioning device 22, whereas corner stop pin 63' and 64' (at the lower right portion of FIG. 1) define an opposite righthand limit position of frame 22. The motors 26 and 26' are individually controlled by closed loop digital positioning systems well known to those skilled in the art, and thus such systems will not be shown in the interest of clarity, brevity and economy. Today, such systems often employ micro-processors for providing the positioning control. In brief, a pulse generator is coupled to the output of a central processor, software controlled, and supplies a numerical pulse train that in turn causes the motor to drive the frame 22 to an appropriate desired position in the direction of the arrow 21 of FIG. 1. The resulting mechanical motion causes a pulse train to be provided by the relative motion of scales 31 and 31' with respect to vernier read heads 29 and 29'. These pulses are fed back to the central processor and the resulting accumulated count of the pulses, indicative of the current position of the Y frame member, is compared with the binary position address code, and upon a match, the motor shaft position is held constant. Such a closed loop system would preferably be provided for each motor of FIG. 1 namely 26, 26', 9, and 9'.

Ideally a straight line between corner stop pin 64 and 63 will be absolutely perpendicular to the straight line between pin 63 and pin 63'. However, during the actual manufacturing process, the final position of pin 64 will often be slightly offset from its ideal position by a distance delta for example, shown in FIG. 1, so that the actual pin is positioned at 92, this distance being greatly exaggerated in the Figure. Thus a straight line between 92 and pin 63 will no longer be absolutely perpendicular to the straight line between 63 and 63'. The repositioning of pin 92 at the position occupied by pin 64 is difficult as a practical matter, and is costly. The intrinsic flexibility of frame 22 is advantageously utilized in accordance with the invention as follows.

The "home position" of this system is established by initially driving Y frame 22 to the left until upper portion 90 abuts corner stop pin 63. Lower terminal portion 91 is driven against stop pin 92 owing to the resiliency of the frame. The erroneous offset distance between the center of pin 92 and non-existent but ideally positioned "pin" 64, namely delta, is ascertained by direct measurement, delta corresponding to a number of pulses applied to the stepping motor. For example, let it be assumed three pulses will produce a motion equal to delta. In this case, the software causes three pulses to be applied to motor 26' to step the lower portion 91 of the Y frame to the right, the distance delta. The entire Y frame is thereafter stepped to the right by the application of, for example, 100 pulses to motor 26' and motor 26 driving the upper portion of the Y frame. The result is the establishment of a new "home position" whereby the X and Y axes are exactly perpendicular to each other, notwithstanding the erroneous offset of cornerstop pin 92 from its ideal position at 64. After operation of the system for a time or upon subsequent start up, the "home position" is reestablished by repeating these steps. A slight mispositioning of other corner stop pins would be handled in the same manner.

In another configuration of the invention, the drive motor is located at one screw or equivalent, and the transfer of rotary motion to the drive screw at the other end of the frame is by suitable mechanical means, such as timing belts or any other suitable means. In this configuration, the feedback loop from the mechanically driven frame end is omitted, and the X-Y device will suffer from an error in position and perpendicularity, which may be acceptable in some cases.

It should be understood that the invention is to be limited only by the scope of the following claims and art recognized equivalents thereof. For example the drive means could comprise fluid cylinders having pistons attached to the terminal frame members, linear motors rather than rotary motors actuating threaded (or threadless) drive screws. Cables, chains or drive belts may of course be employed in connection with the use of one motor per frame or two motors. Numerous position readout devices may of course be used in connection with the present invention such as elongated impedance devices, potentiometers, lasers coacting with mirrors mounted upon the moving portions of the X-Y system, or other rotary or linear encoders. Well known closed or open loop electronic positioning controls may be employed. For certain applications, the top plate 51 may be eliminated, the workpiece being directly mounted upon the post members. The base means or table, could of course be provided by the user, rather than the manufacturer. The post means besides comprising the unitary block or the eight post members of FIG. 1, could comprise four post members positioned at the inside corners of the intersecting frames or at any other corners thereof.

I claim:

1. In an X-Y table for precisely positioning a load supported by post means positioned intermediate said load and a base means:
first load positioning means directly coupled to said post means having first drive means coupled thereto for moving said post means in a first direction together with second load positioning means oriented in an overlapping relationship with said first positioning means, directly coupled to said post means and having second drive means for moving said post means in a second direction transverse to said first direction, means for affixing said first and second drive means to said base means, said first and second positioning means including first and second elongated frame means having inside portions thereof in contact with outer portions of said post means for pushing against said post means to move said load, and wherein said first and second elongated frame means each include a pair of straight parallel pusher bars, the distances between inside portions thereof being equal to the distances between outside portions of said post means.

2. The combination as set forth in claim 1 wherein said elongated frame means each include at least one terminal member coupled between said pusher bars and means for coupling said terminal member to associated drive means.

3. The combination as set forth in claim 1 wherein said post means comprises a unitary support member nested between the inside surfaces of said first and second elongated frame means of said first and second positioning means and positioned to directly support said load.

4. The combination as set forth in claim 2 wherein said post means comprises a unitary support member nested between the inside surfaces of said first and second elongated frame means of said first and second positioning means and positioned to directly support said load.

5. The combination as set forth in claim 1 wherein said post means comprises first and second pairs of post members positioned against inner portions of said first elongated frame means and against outer portions of said second elongated frame means along with third and fourth pairs of post members positioned against outer portions of said first frame means and inner portions of said second frame means.

6. The combination as set forth in claim 2 wherein said post means comprises first and second pairs of post members positioned against inner portions of said first elongated frame means and against outer portions of said second elongated frame means along with third and fourth pairs of post members positioned against outer portions of said first frame means and inner portions of said second frame means.

7. The combination as set forth in claim 1 wherein said post means comprises first, second, third and fourth pairs of post members rigidly coupled together by a top plate for supporting said load.

8. The combination as set forth in claim 1 wherein each pair of pusher bars of said elongated frame means are perpendicular to each other.

9. In an X-Y table for precisely positioning a load supported by post means positioned intermediate said load and a base means:
first load positioning means directly coupled to said post means having first drive means coupled thereto for moving said post means in a first direction together with second load positioning means oriented in an overlapping relationship with said first positioning means, directly coupled to said post means and having second drive means for moving said post means in a second direction transverse to said first direction, means for affixing said first and second drive means to said base means, said first and second positioning means including first and second elongated frame means having inside portions thereof in contact with outer portions of said post means for pushing against said post means to move said load, and wherein said post means comprises a unitary support member nested between the inside surfaces of said first and second elongated frame means of said first and second positioning means and positioned to directly support said load.

10. In an X-Y table for precisely positioning a load supported by post means positioned intermediate said load and a base means:
first load positioning means directly coupled to said post means having first drive means coupled thereto for moving said post means in a first direction together with second load positioning means oriented in an overlapping relationship with said first positioning means, directly coupled to said post means and having second drive means for moving said post means in a second direction transverse to said first direction, means for affixing said first and second drive means to said base means, said first and second positioning means including first and second elongated frame means having inside portions thereof in contact with outer portions of said post means for pushing against said post means to move said load, and wherein said post means comprises first and second pairs of post members positioned against inner portions of said first elongated frame means and against outer portion of said second elongated frame means along with third and fourth pairs of post members positioned against outer portions of said first frame means and inner portions of said second frame means.

11. In an X-Y table for precisely positioning a load supported by post means:
first load positioning means slidably containing said post means having first drive means coupled thereto for moving said first positioning means soley along a first line of travel together with second load positioning means oriented in an overlapping relationship with said first positioning means, slidably containing said post means and having second drive means for moving said second positioning means soley along a second line of travel transverse to said first line of travel, and wherein said first and second positioning means include first and second elongated frame means inside portions thereof in contact with outer portions of said post means for pushing against said post means to move said load, and wherein said first and second elongated frame means each include a pair of straight parallel pusher bars, the distance between inside portions thereof being equal to the distances between outer portions of said post means.

12. The combination as set forth in claim 11 wherein said elongated frame means each include at least one terminal member coupled between said pusher bars and means for coupling said terminal member to associated drive means.

13. The combination as set forth in claim 11 wherein said post means comprises a unitary support member nested between the inside surfaces of said first and second elongated frame means of said first and second positioning means and positioned to directly support said load.

14. The combination as set forth in claim 12 wherein said post means comprises a unitary support member nested between the inside surfaces of said first and second elongated frame means of said first and second positioning means and positioned to directly support said load.

15. The combination as set forth in claim 11 wherein said post means comprises first and second pairs of post members positioned against inner portions of said first elongated frame means and against outer portions of said second elongated frame means along with third and fourth pairs of post members positioned against outer portions of said first frame means and inner portions of said second frame means.

16. The combination as set forth in claim 12 wherein said post means comprises first and second pairs of post members positioned against inner portions of said first elongated frame means and against outer portions of said second elongated frame means along with third and fourth pairs of post members positioned against outer portions of said first frame means and inner portions of said second frame means.

17. The combination as set forth in claim 11 wherein said post means comprises first, second, third and fourth pairs of post members rigidly coupled together by a top plate for supporting said load.

18. The combination as set forth in claim 11 wherein each pair of pusher bars of said elongated frame means are perpendicular to each other.

19. In an X-Y table for precisely positioning a load supported by post means:
first load positioning means slidably containing said post means having first drive means coupled thereto for moving said first positioning means soley along a first line of travel together with second load positioning means oriented in an overlapping relationship with said first positioning means, slidably containing said post means and having second drive means for moving said second positioning means soley along a second line of travel transverse to said first line of travel, and wherein said first and second positioning means include first and second elongated frame means inside portions thereof in contact with outer portions of said post means for pushing against said post means to move said load, and wherein said post means comprises a unitary support member nested between the inside surface of said first and second elongated frame means of said first and second positioning means and positioned to directly support said load.

20. In an X-Y table for precisely positioning a load supported by post means:
first load positioning means slidably containing said post means having first drive means coupled thereto for moving said first positioning means soley along a first line of travel together with second load positioning means oriented in an overlapping relationship with said first positioning means, slidably containing said post means and having second drive means for moving said second positioning means soley along a second line of travel transverse to said first line of travel, and wherein said first and second positioning means include first and second elongated frame means inside portions thereof in contact with outer portions of said post means for pushing against said post means to move said load, and wherein said post means comprises first and second pairs of post members positioned against inner portions of said first elongated frame means and against outer portion of said second elongated frame means along with third and fourth pairs of post members positioned against outer portions of said first frame means and inner portions of said second frame means.

21. In an X-Y table for precisely positioning a load supported by post means positioned intermediate said load and a base means:
first movable load positioning and guiding means directly coupled to said post means having first drive means coupled thereto for moving said post means in a first direction and for guiding said post means in a second direction transverse to said first direction together with second movable load positioning and guiding means oriented in an overlapping relationship with said first movable load positioning and guiding means, directly coupled to said post means and having second drive means for moving said post means in a second direction transverse to said first direction and for guiding said post means in said first direction, said first and second movable positioning and guiding means being the sole mechanical guiding means for said load, and means for affixing said first and second drive means to said base means.

22. The X-Y table of claim 21 wherein said first and second movable load positioning and guiding means comprise a first and second pair of parallel pusher bars.

23. The X-Y table of claim 22 wherein said first and second pair of pusher bars are orthogonally oriented with respect to each other.

24. The X-Y table of claim 22 wherein said parallel pusher bars have sufficient flexibility for enabling said drive means to drive a first terminal portion of said first pair of pusher bars against a first stop element out of alignment with a second stop element co-acting with a second opposite terminal portion of said first pair of pusher bars.

25. The X-Y table of claim 21 wherein said post means comprises a plurality of separate post members, each having drive surfaces thereon transversely positioned with respect to said first direction and said second direction.

26. The X-Y table of claim 25 including means for rigidly coupling said post members together.

* * * * *